United States Patent
Stone et al.

(10) Patent No.: US 8,100,655 B2
(45) Date of Patent: Jan. 24, 2012

(54) METHOD OF MACHINING AIRFOIL ROOT FILLETS

(75) Inventors: Paul Stone, Guelph (CA); Dinesh Chawla, Mississauga (CA); Frank Kelly, Oakville (CA); Edward Fazari, Etobicoke (CA); Kari Heikurinen, Oakville (CA); Ignatius Theratil, Mississauga (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 1173 days.

(21) Appl. No.: 12/057,923

(22) Filed: Mar. 28, 2008

(65) Prior Publication Data

US 2009/0246032 A1    Oct. 1, 2009

(51) Int. Cl.
*F01D 11/00* (2006.01)

(52) U.S. Cl. ............... 416/193 A; 416/223 A; 416/248; 29/889.2; 409/132

(58) Field of Classification Search ............. 416/193 A, 416/223 A, 248; 409/131, 132; 29/557, 29/889.2

See application file for complete search history.

(56) References Cited

U.S. PATENT DOCUMENTS

| | | |
|---|---|---|
| 3,890,062 A | 6/1975 | Hendrix et al. |
| 5,061,154 A | 10/1991 | Kington |
| 5,435,694 A | 7/1995 | Kray et al. |
| 6,471,474 B1 | 10/2002 | Mielke et al. |
| 6,478,539 B1 * | 11/2002 | Trutschel ...................... 415/223 |
| 6,490,791 B1 * | 12/2002 | Surace et al. ................ 29/889.1 |
| 6,524,070 B1 | 2/2003 | Carter |
| 6,672,966 B2 | 1/2004 | Muju et al. |
| 6,684,742 B1 * | 2/2004 | White ........................... 82/1.11 |
| 6,905,310 B2 | 6/2005 | Kawamoto et al. |
| 7,637,010 B2 * | 12/2009 | Burgess et al. ............ 29/889.23 |
| 7,704,021 B2 * | 4/2010 | Hollmann et al. ............ 409/132 |

* cited by examiner

*Primary Examiner* — Edward Look
*Assistant Examiner* — Andrew C Knopp
(74) *Attorney, Agent, or Firm* — Norton Rose OR LLP

(57) ABSTRACT

An airfoil root fillet having a predetermined compound curve profile can be flank milled with a single flank milling cutter having a generally conical flank milling portion and a rounded tip portion defining a compound curve.

10 Claims, 3 Drawing Sheets

METHOD OF MACHINING AIRFOIL ROOT FILLETS

TECHNICAL FIELD

The application relates generally to gas turbine engines and, more particularly, to the design and machining of airfoil root fillets with complex curve geometry.

BACKGROUND OF THE ART

Gas turbine engine airfoils are subject to high steady state and vibration stresses during use. The resulting mechanical stresses tend to be particularly important at the root of the airfoils that is at the juncture between the airfoils and the associated supporting structure. Fillets have been used at the junction between the airfoils and the supporting structure to reduce stress concentration. Generally, the larger the fillet radius, the lower the stress concentration is. However, the radius of the fillets is limited by 1) the impact it might have of the flow performance of the working fluid being acted upon by the airfoils and 2) by the airfoil resonant frequency criteria. The design of the fillet is farther limited by the manufacturing constraints.

Accordingly, there is a need to provide a new. airfoil root fillet design and machining process.

SUMMARY

In one aspect, there is provided a method of machining an airfoil root fillet at a transition from an airfoil surface to a gaspath surface of a gas turbine engine, the method comprising: providing a single flank milling cutter having a primary conical milling surface and. a secondary tip milling surface, said secondary tip milling surface defining a compound curve; and using said secondary tip milling surface of said flank milling cutter to generate a compound curve at the transition between the airfoil surface and the gaspath surface, said compound curve having a curvature which generally increases towards said gaspath surface.

In a second aspect, there is provided a method of machining a fillet at the juncture of a gas turbine engine airfoil and a gaspath surface, the fillet defining a compound curve, the method comprising: providing a flank milling cutter having a primary flank milling surface and a tip milling surface, said tip milling surface having a compound curvature including at least two different radii, and using said tip milling surface to generate the compound curve of the fillet while said primary flank milling surface is used to machine a surface of said airfoil.

In a third aspect, there is provided a method of machining an airfoil root fillet having a predetermined compound curve profile using a single cutter; comprising providing a flank milling cutter having a generally conical flank milling portion and a rounded tip portion defining a compound curve having at least two different radii of curvature, and following the predetermined compound curve profile of the airfoil root fillet all along a contour of the airfoil root with the rounded tip portion of the flank milling cutter.

According to a fourth aspect, there is provided a method of machining an integrated bladed rotor (IBR) comprising a disc and a plurality of integral airfoils extending outwardly from the disc; the method comprising: flank milling each airfoil with a flank milling cutter having an axially extending conical milling surface and a rounded tip portion defining a compound curve having at least two different radii, and using said compound curve of said rounded tip portion to generate a compound curve fillet all along a perimeter of a root of said airfoils.

According to a fifth aspect, there is provided a bladed rotor comprising a plurality of airfoils extending outwardly from a hub surface, and a fillet provided at a transition between each of said airfoils and the hub surface, said fillet having a primary curve segment fairing from an airfoil surface and as secondary curve segment fairing into said hub surface, said secondary curve segment having a curvature which is about five time greater than that of said primary curve segment.

Further details of these and other aspects will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
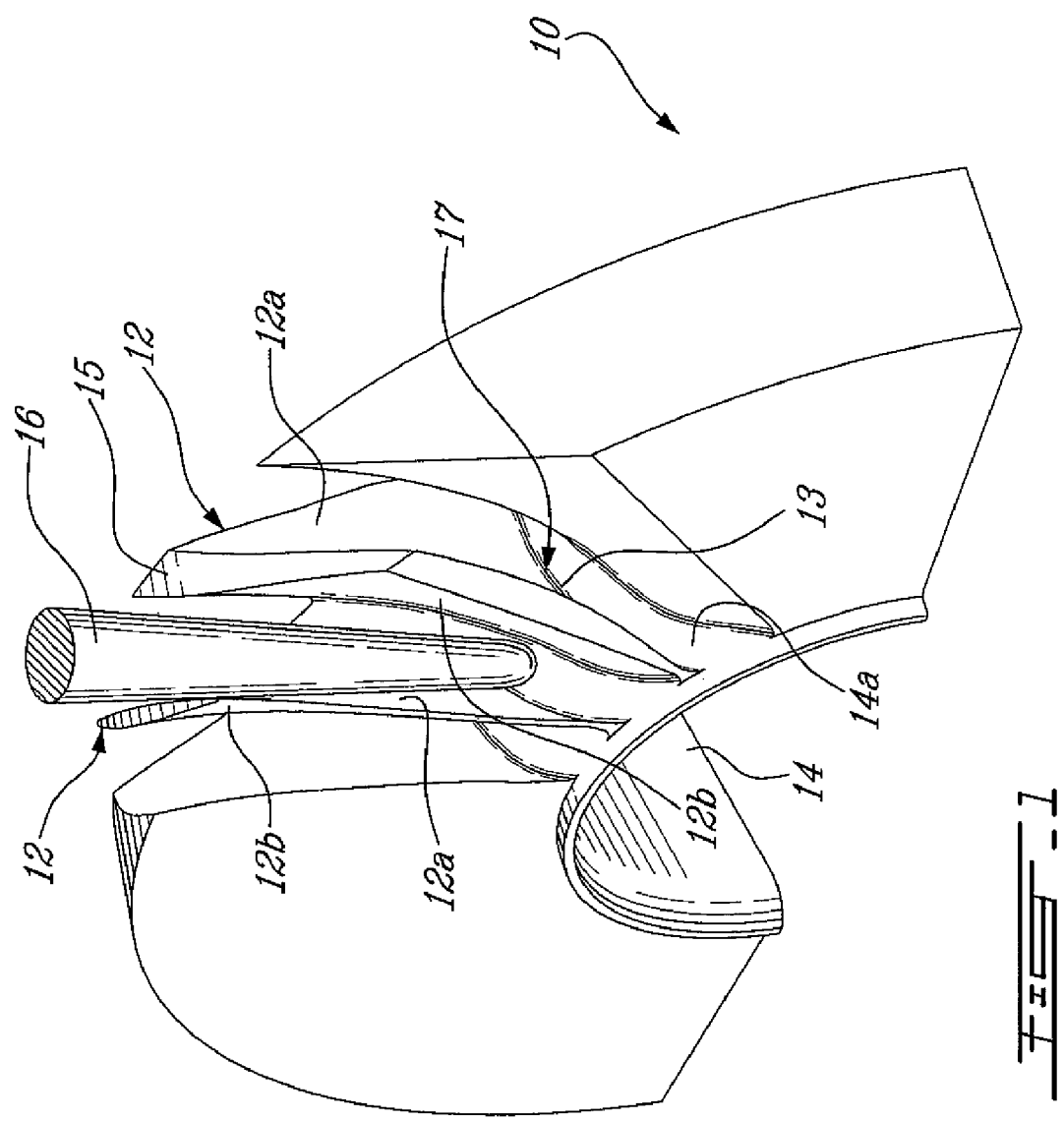
FIG. 1 is an isometric view illustrating an integrated bladed rotor (IBR) in the process of being flank milled.
Figure 2:
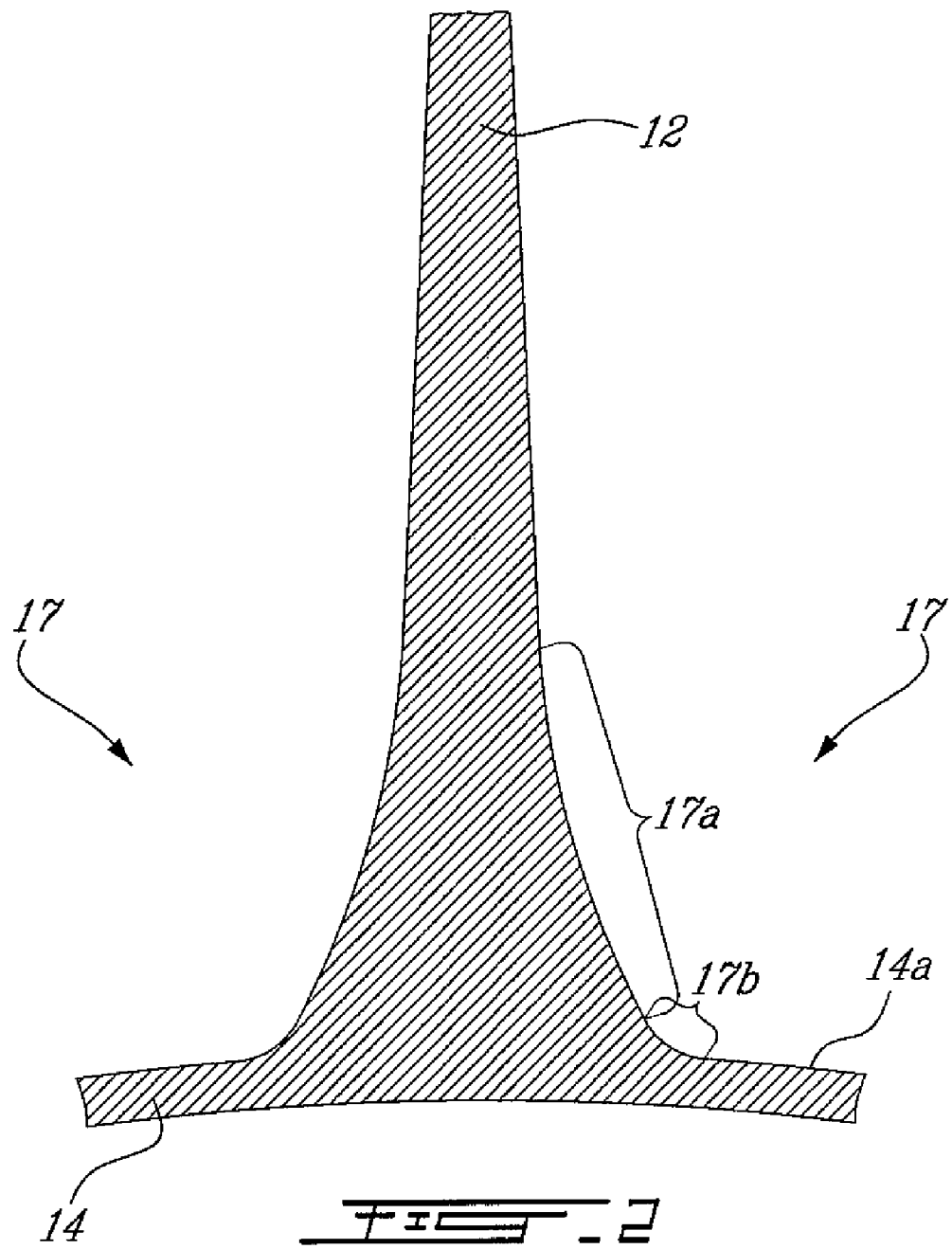
FIG. 2 is a schematic front cross-sectional view of a portion of the IBR illustrating the compound curve profile of one of the airfoil root fillets.

FIG. 1 illustrates an integrated bladed rotor (IBR) 10 in the process of being machined. IBRs are also known as bladed discs (blisks) and generally comprise a plurality of integral airfoils 12 extending radially outwardly from a hub 14. Such IBRs are typically mounted in the compressor section of gas turbine engines for rotation about the central axis of the engines. The rotation of the IBR 10 imparts energy to the incoming air which is first accelerated and then diffused for recovering of energy to compress the air. The radially outer surface of the hub 14 provides a radially inner flowpath surface 14a for the air flowing axially through the IBR 10. Each airfoil 12 has a concave airfoil pressure side 12a and an opposite convex airfoil suction side 12b extending radially from a root 13 to a tip 15. A root fillet 17 (as best shown in FIG. 2) extends circumferentially completely around each airfoil 12 between the airfoil 12 and the flowpath surface 14a of the hub 14. As will be seen hereinbelow, the root fillet 17 is configured so as to significantly reduce the stress concentration at the root 13 of the airfoils 12 and to provide improved strength to the transition of the airfoils 12 to the hub 14 as compared to conventional single-radius fillets.

As shown in FIG. 2, each root fillet 17 defines, in profile, a complex or compound curve which can be generally defined as having a major segment or primary large radius area 17a adjacent the airfoil 12 followed by a minor segment or secondary small radius area 17b adjacent the flowpath surface 14a. The "average radius" of curvature of the large radius area 17a is almost five times larger than the radius of curvature of the small radius area 17b (or conversely the curvature, i.e. the rate of change per unit arc length, of the small radius area 17b is about 5 times greater than that of the large radius area 17a). For instance, the large radius area 17a may have an "average radius" of 1.000 inch and the small radius area 17b a radius of 0.210 inch. Such a ratio has been found suitable to both reduce steady stress at the airfoil roots 13 and tune the third mode blade frequency. The primary large radius area 17a is defined by a complex curve that blends smoothly into the airfoil 12 and that does not truly have one radius per se. The small or secondary radius area 17b is rather typically defined in profile by a complex or compound curve composed of a plurality of curve segments of successively shorter radii in a direction towards the gaspath surface 14a. Tangent continuity is provided between the airfoil 12 and the primary large radius area 17a, and the primary large radius area 17a and the small radius area 17b. The primary large radius area 17a provides a less abrupt transition between the airfoil surfaces 12a and 12b and the gaspath surface 14a. This contributes to reduce the stress concentration factor at the root of the airfoils and results in an overall lower peak stress. The small radius area 17b has a single radius and defines a simple arc of circle which smoothly blend into the gaspath surface 14a. Tangent continuity is provided between the small radius area 17b and the gaspath surface 14a.

As can be seen from FIG. 1, the complex geometry of the root fillets 17, including the large radius area 17a and the small radius area 17b, can be generated with a single flank milling cutter 16 which is also used to machine the pressure and suction surfaces 12a and 12b of the airfoils 12.

Figure 3:
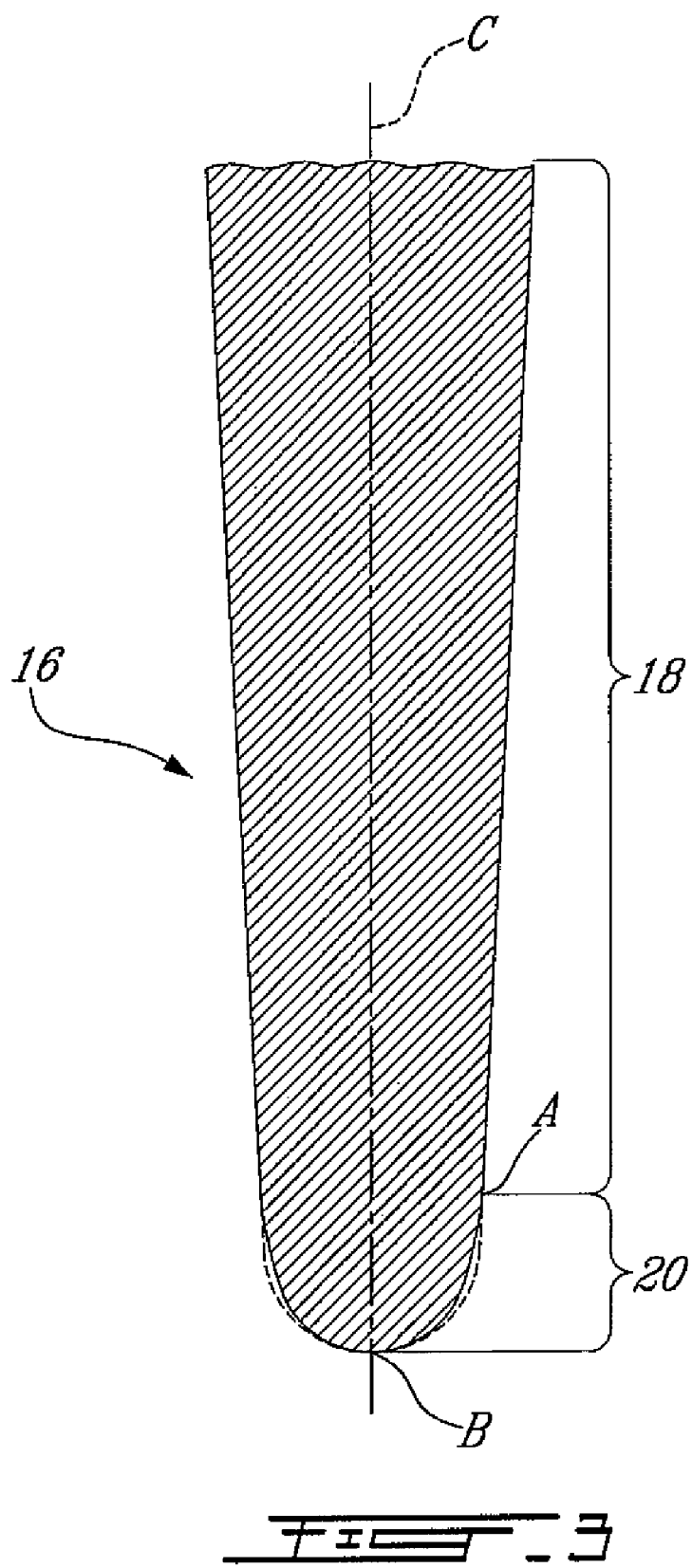
FIG. 3 is a cross-sectional side view of a flank milling cutter used to generate compound curve root fillets at the juncture or transition between the airfoils and the hub of the IBR.

As shown in FIG. 3, the flank milling cutter 16 has a primary conical flank milling portion 18 and a rounded tip portion 20, which can be made of any suitable grinding materials. The rounded tip portion 20 has a profile which differs from that of a conventional flank milling tip portion having a single radius of curvature, as shown in dotted lines in FIG. 3. The rounded tip portion 20 rather generally defines in profile a compound curve having a variable curvature between points A and B. Point A corresponds to the junction of the conical milling portion 18 and the tip portion 20, whereas point B corresponds to the intersection of the compound curve defined by the rounded tip portion 20 and the central axis of the cutter 16. The compound curve between points A and B has at least two different radii. The radius adjacent point A is generally larger than the radius in the vicinity of point B. The compound radius in the tip portion 20 of the flank milling cutter 16 provides for the formation of the compound fillets 17 all along the perimeter of the roots 13 of the airfoils 12. The compound curve geometry of the tip portion 20 of the flank milling cutter 16 has been selected to obtain the desired complex curve described by the primary area 17a of the airfoil root fillets 17.

Referring back to FIG. 1, it can be seen that the airfoils 12 and their compound root fillets 17 are flank milled by plunging the conical cutter 16 into the peripheral circumferential surface of an IBR blank, which can be provided in the form of a disc-shaped block of material (e.g. titanium alloy or nickel alloy). The flank milling cutter 16 is mounted to a numerically controlled multi-axis machine (not shown) for multi-axis motion between adjacent airfoils to be machined while being driven into rotation about its central axis C (FIG. 3). The multi-axis machine is programmed to generate multi-axis movements between the IBR blank and the cutter 16 so as to cause the conical flank milling portion 18 to follow the desired geometry of the airfoil surface being machined. The tool path is programmed for the compound curve tip portion 20 of the cutter 16 to engage the material at the root of the airfoil such as to generate the compound curve profile shown in FIG. 2.

The above description is meant to be exemplary only, and one skilled in the art will recognize that changes may be made to the embodiments described without departing from the scope of the invention disclosed. For example, while the compound-like curve fillet profile has been described in the context of an IBR, it is understood that the same concept could be applied to separately bladed rotor design between an airfoil and a platform. Other applications requiring stress reduction at the junction between an airfoil and a gaspath surface or carrying surface are contemplated as well. Accordingly, the term gaspath surface should be broadly interpreted to refer to any surface from which a compressor or turbine airfoil extends. Still other modifications which fall within the scope of the present invention will be apparent to those skilled in the art, in light of a review of this disclosure, and such modifications are intended to fall within the appended claims.

What is claimed is:

1. A method of machining an airfoil root fillet at a transition from an airfoil surface to a gaspath surface of a gas turbine engine, the method comprising: providing a single flank milling cutter having a primary conical milling surface and a secondary tip milling surface, said secondary tip milling surface defining a compound curve; and using said single flank milling cutter to machine both the airfoil surface and the airfoil root fillet, including using said secondary tip milling surface of said flank milling cutter to generate a compound curve at the transition between the airfoil surface and the gaspath surface, said compound curve having a curvature which generally increases towards said gaspath surface, wherein said compound curve defined by the airfoil root fillet has a primary curve segment extending from the airfoil surface and a secondary curve segment merging into said gaspath surface, wherein said secondary curve segment has a curvature which is about 5 times greater than the curvature of said primary curve segment.

2. The method defined in claim 1, wherein providing a flank milling cutter comprises providing at least two different radii in said tip milling surface with a first radius adjacent a central axis of the flank milling cutter being smaller than a second radius adjacent said primary conical milling surface.

3. The method defined in claim 1, wherein said primary curve segment has a plurality of radii, and wherein said secondary segment is an arc of circle.

4. A method of machining a fillet at the juncture of a gas turbine engine airfoil and a gaspath surface, the fillet defining a compound curve, the method comprising: providing a flank milling cutter having a primary flank milling surface and a tip milling surface, said tip milling surface having a compound curvature including at least two different radii, and using said tip milling surface to generate the compound curve of the fillet while said primary flank milling surface is used to machine a surface of said airfoil, wherein said compound curve has a first curve segment fairing from said airfoil and a second curve segment extending from said first curve segment before fairing into said qaspath surface, and wherein said second curve segment has a curvature which is about five times greater than that of said first curve segment.

5. The method defined in claim 4, wherein the second segment is circular.

6. The method defined in claim 4, wherein the primary flank milling surface is conical.

7. A method of machining an integrated bladed rotor (IBR) comprising a disc and a plurality of integral airfoils extending outwardly from the disc; the method comprising: flank milling each airfoil with a flank milling cutter having an axially extending conical milling surface and a rounded tip portion defining a compound curve having at least two different radii, and using said compound curve of said rounded tip portion to generate a compound curve fillet all along a perimeter of a root of said airfoils, the compound curve fillet having a primary curve segment extending from an airfoil surface and a secondary curve segment merging into a gaspath surface at the periphery of the disc, the secondary curve segment having a curvature which is about five times greater than that of the primary curve segment.

8. A bladed rotor comprising a plurality of airfoils extending outwardly from a hub surface, and a fillet provided at a transition between each of said airfoils and the hub surface, said fillet having a primary curve segment fairing from an airfoil surface and as secondary curve segment fairing into said hub surface, said secondary curve segment having a curvature which is about five time greater than that of said primary curve segment, the ratio of curvature between the secondary curve segment and the primary curve segment providing a tuning effect on the third mode blade frequency.

9. The bladed rotor defined in claim 8, wherein said primary curve segment defines a compound curve composed of at least two circular arcs of successively shorter radii.

10. The bladed rotor defined in claim 8, wherein said secondary curve segment is an arc of circle.

* * * * *